United States Patent [19]
Nakamura et al.

[11] Patent Number: 6,107,377
[45] Date of Patent: Aug. 22, 2000

[54] PROPYLENIC RESIN AND BLOW MOLDED ARTICLE MADE THEREFROM

[75] Inventors: Tetsuya Nakamura; Masaya Tsubokawa, both of Ichihara, Japan

[73] Assignee: Idemitsu Petrochemical Co., Ltd., Tokyo, Japan

[21] Appl. No.: 09/154,720

[22] Filed: Sep. 17, 1998

[51] Int. Cl.$^7$ ...................................................... C08K 5/51

[52] U.S. Cl. ...................... 524/153; 264/171.23; 524/291

[58] Field of Search ..................................... 524/153, 291; 526/351; 264/171.23

[56] References Cited

U.S. PATENT DOCUMENTS

| | | | |
|---|---|---|---|
| 4,499,247 | 2/1985 | Chiba et al. | 526/351 |
| 4,500,682 | 2/1985 | Chiba et al. | 526/351 |
| 5,298,540 | 3/1994 | Pauquet et al. | 521/46 |
| 5,736,613 | 4/1998 | Kijima et al. | 525/247 |
| 5,804,623 | 9/1998 | Hoffman et al. | 523/153 |

OTHER PUBLICATIONS

T.J. Henman . . "Melt Stabilization of Polypropylene" —39, 45,76–83,92–95–Developments in Polymer Stabilization–1, ed. Gerald Scott, 1979.

*Primary Examiner*—Veronica P. Hoke
*Attorney, Agent, or Firm*—Oblon, Spivak, McClelland, Maier & Neustadt, P.C.

[57] ABSTRACT

A propylene resin composition containing a phenolic antioxidant, and a phosphorus-containing antioxidant which has a differential melt index ($\Delta$MI) calculated from a melt index (MIi) as measured at a propylene temperature of 230° C. and under a load of 2,160 g and a melt index (MIe) as measured at a propylene temperature of 230° C. and under a load of 2,160 g after five repetitions of a 100% recycle test is not greater than 0.5 g/10 min, and MIe is not greater than 1.2 g/10 min. This propylene resin composition enables manufacture of large-sized blow-molded articles featuring light weight, excellent rigidity, dimensional stability, heat resistance and showing good drawdown resistance, suitable for continuous blow molding. Blow moldings are advantageously used as automobile bumpers, bumper beams, or like parts.

6 Claims, No Drawings

PROPYLENIC RESIN AND BLOW MOLDED ARTICLE MADE THEREFROM

BACKGROUND OF THE INVENTION

1. Field of the Invention

The present invention relates to a highly rigid propylene resin composition and to a blow-molded article made from the composition. More particularly, the invention relates to a highly rigid propylene resin composition which enables manufacture of large-sized blow-molded articles featuring light weight and excellent rigidity, dimensional stability, and heat resistance and which shows good drawdown resistance and is suited for continuous blow molding as well as to a blow-molded article which is made from the composition and is advantageously used as, particularly, an automobile bumper, bumper beam, or a like part.

2. Description of the Related Art

Conventionally, propylene resins are used as general-purpose resins for manufacturing products of various shapes by various molding methods, including extrusion molding, injection molding, and blow molding. Because blow molding makes use of inexpensive molds and is a simple molding process attained through employment of integral molding, it has been intensively used for molding large-sized structural elements, mainly automobile parts. In view of specific gravity, rigidity, dimensional stability, and heat resistance, in many cases propylene resins are used as materials for such blow molding. However, such conventionally used propylene resins are not necessarily satisfactory in terms of drawdown resistance or rigidity required for blow molding.

To solve the above problem, various improvements on propylene resins have been attempted. For example, U.S. Pat. No. 4,550,145 and U.S. Pat. No. 5,736,613 disclose a highly rigid propylene resin which is manufactured through multi-step polymerization, including polymerization of propylene and copolymerization of propylene and ethylene, and which allows manufacture of a large-sized blow-molded article featuring light weight and excellent rigidity, dimensional stability, and heat resistance, through adjustment of its melt index and the relation between its elongational viscosity and its melt index.

The thus-obtained propylene resin shows improved drawdown resistance in an initial stage of continuous production of large-sized blow-molded parts having a parison weight of, for example, not less than 3 kg, particularly not less than approximately 5 kg. However, as blow molding continues, the propylene resin becomes impaired in drawdown resistance, resulting in disabled molding or nonuniform thickness distribution of a blow-molded product. Thus, continuous production using the propylene resin as a blow-molding material tends to become unstable.

Accordingly, an object of the present invention is to provide a propylene resin composition which enables manufacture of large-sized blow-molded articles featuring light weight and excellent rigidity, dimensional stability, and heat resistance and which shows good drawdown resistance.

Another object of the present invention is to provide a blow-molded article which is made from the composition and is advantageously used as, particularly, a large-sized automobile part, such as a bumper, a bumper beam, a seat back, an instrument panel, or a like part.

SUMMARY OF THE INVENTION

In view of the foregoing, the inventors of the present invention conducted extensive studies in an attempt to develop a highly rigid propylene resin having the above features and a blow-molded article made therefrom. Specifically, the inventors obtained a propylene resin which shows a melt index falling within a certain range after undergoing a recycle test, particularly a propylene resin produced through multi-step polymerization, involving polymerization of propylene and copolymerization of propylene and ethylene. A certain antioxidant was added to the thus-obtained propylene resin, yielding a propylene resin composition. Also, a blow-molded article was made from the propylene resin composition. The resultant propylene resin composition and the blow-molded article were found to be satisfactory, leading to completion of the invention.

The present invention provides the following propylene resin compositions and blow-molded articles made therefrom, particularly large-sized automobile parts, such as bumpers, bumper beams, seat backs, and instrument panels.

(1) A propylene resin composition comprising a propylene resin, a phenolic antioxidant, and a phosphorus-containing antioxidant, wherein a differential melt index ($\Delta MI$) calculated from a melt index (MIi) of the propylene resin composition as measured at a temperature of 230° C. and under a load of 2,160 g and a melt index (MIe) of the propylene resin composition obtained after five repetitions of a 100% recycle test as measured at a temperature of 230° C. and under a load of 2,160 g is not greater than 0.5 g/10 min, and an MIe is not greater than 1.2 g/10 min.

(2) A propylene resin composition as described in (1), wherein the propylene resin satisfies the following relationship between elongational viscosity (TE) and melt index (MIi) as measured at a temperature of 230° C. and under a load of 2,160 g:

$$8.0 \times 10^5 \times MIi^{-0.68} \geq \eta_E \geq 1.5 \times 10^5 \times MIi^{-0.68},$$

preferably, $$4.8 \times 10^5 \times MIi^{-0.68} \geq \eta_E \geq 1.5 \times 10^5 \times MIi^{-0.68}$$

and particularly preferably, $$2.0 \times 10^5 \times MIi^{-0.68} \geq \eta_E \geq 1.5 \times 10^5 \times MIi^{-0.68}.$$

(3) A propylene resin composition as described in (1) or (2), wherein the propylene resin is obtained through multi-step polymerization of a propylene polymer and a propylene-ethylene copolymer.

(4) A propylene resin composition as described in any of (1) to (3), wherein the phenolic antioxidant and the phosphorus-containing antioxidant are added in a total amount of not less than 2,000 ppm with respect to the propylene resin.

(5) A blow molding material comprising a propylene resin composition having a differential melt index ($\Delta MI$) of not greater than 0.5 g/10 min as calculated from a melt index (MIi) of propylene resin composition as measured at a temperature of 230° C. and under a load of 2,160 g and a melt index (MIe) of propylene resin composition obtained after five repetitions of a 100% recycle test as measured at a temperature of 230° C. and under a load of 2,160 g, and having an MIe of not greater than 1.2 g/10 min.

(6) A blow-molded article obtained through blow molding of a propylene resin composition or blow molding material as described in any of (1) to (5).

(7) An automobile bumper obtained through blow molding of a propylene resin composition or blow molding material as described in any of (1) to (5).

DESCRIPTION OF THE PREFERRED EMBODIMENTS

A propylene resin composition of the present invention and a blow-molded article made from the composition will next be described.

The propylene resin composition of the present invention is composed of a certain propylene resin, a phenolic antioxidant, and a phosphorus-containing antioxidant.

The propylene resin composition of the present invention has a differential melt index (ΔMI) of not greater than 0.5 g/10 min, as calculated from a melt index (MIi) as measured at a temperature of 230° C. and under a load of 2,160 g and a melt index (MIe) as measured at a temperature of 230° C. and under a load of 2,160 g after five repetitions of a 100% recycle test, which will be described later, and has an MIe of not greater than 1.2 g/10 min.

ΔMI (MIe−MIi) is typically 0 or a positive value. In the present invention, ΔMI is not greater than 0.5 g/10 min, preferably not greater than 0.45 g/10 min. If a resin composition has a ΔMI in excess of 0.5 g/10 min, continuous blow molding using the resin composition will suffer an impairment in drawdown resistance, disabled molding, or nonuniform thickness distribution of a blow-molded product, resulting in a reduction in productivity.

The propylene resin composition of the present invention has a melt index (MIe) of not greater than 1.2 g/10 min as measured after five repetitions of a 100% recycle test. If MIe is in excess of 1.2 g/10 min, blow molding of a large-sized article may become difficult. In view of discharge rate during blow molding, productivity, and moldability, the MIe is preferably 0.2 to 1.1 g/10 min, more preferably 0.3 to 1.0 g/10 min.

In the present invention, the melt index (MIi) of a propylene resin composition as measured before a 100% recycle test is not particularly limited, but preferably is not greater than 1.0 g/10 min. If the MIi is in excess of 1.0 g/10 min, the MIe as measured after the 100% recycle test may become too high. In view of continuous blow molding productivity and moldability, the MIi is preferably 0.2 to 0.8 g/10 min, more preferably 0.3 to 0.7 g/10 min.

In the present invention, the 100% recycle test refers to a test that repeats a cycle of pelletizing a propylene resin composition at a resin temperature of 270° C. and subjecting resultant pellets to pelletization at the same resin temperature. A propylene resin composition obtained after five repetitions of the 100% recycle test refers to that obtained through five cycles of the pelletization.

The propylene resin of the present invention preferably satisfies the relationship between elongational viscosity ($\eta_E$ (Pas)) and the above-mentioned MIi as represented by the expression:

$$8.0 \times 10^5 \times MIi^{-0.68} \geq \eta_E \geq 1.5 \times 10^5 \times MIi^{-0.68}$$

more preferably, $$4.8 \times 10^5 \times MIi^{-0.68} \geq \eta_E \geq 1.5 \times 10^5 \times MIi^{-0.68}$$

particularly preferably, $$2.0 \times 10^5 \times MIi^{-0.68} \geq \eta_E \geq 1.5 \times 10^5 \times MIi^{-0.68}.$$

If $\eta_E$ is lower than $1.5 \times 10^5 \times MIi^{-0.68}$, a parison will show significant drawdown during blow molding; consequently, blow molding of a large-sized article corresponding to a parison of not less than 3 kg, particularly not less than 5 kg, becomes difficult. By contrast, if the $\eta_E$ is greater than $8.0 \times 10^5 \times MIi^{-0.68}$, blow molding may suffer an insufficient discharge rate, resulting in a reduction in productivity.

Herein, the elongational viscosity $\eta_E$ is measured through use of a drawing rheometer manufactured by Iwamoto Seisakusho Co., Ltd. in the following manner. A sample bar having a diameter of 3 mm and a length of 20 cm is placed stationary in silicone oil for 15 minutes and is then measured for elongational viscosity n, at a temperature of 175° C., a strain rate of 0.05 sec$^{-1}$, and a strain of 2.0.

Within the scope of the present invention, an additional thermoplastic resin may be added to the propylene resin of the present invention. Examples of the additional thermoplastic resin include polyolefin resins such as linear high-density polyethylene, linear low-density polyethylene, high-pressure low-density polyethylene, isotactic polypropylene, syndiotactic polypropylene, block polypropylene, random polypropylene, polybutene, 1,2-polybutadiene, 4-methylpentene, cyclized polyolefin, or copolymers thereof; polystyrene resins such as atactic polystyrene, isotactic polystyrene, HIPS, ABS, AS, styrene-methacrylic acid copolymers, styrene-alkyl methacrylate ester copolymers, styrene-diglycidyl methacrylate ester copolymers, styrene-acrylic acid copolymers, styrene-alkyl acrylate ester copolymers, styrene-maleic acid copolymers, or styrene-fumaric acid copolymers; polyester resins such as polycarbonate, polyethylene terephthalate, or polybutylene terephthalate; polyamides such as polyamide 6 or polyamide 6,6; polyphenylene ethers; polyarylene sulfides; and fluorinated polyethylene resins such as poly(tetrafluoroethylene) (PTFE). Of these, polyolefins such as polyethylene or polypropylene are preferred. These thermoplastic resins may be used singly or in combination of two or more species.

No particular limitation is imposed on the method for producing the propylene resin of the present invention, and any of a variety of methods may be employed so long as the method produces a propylene resin which satisfies the above-described conditions. In particular, there may be suitably employed a method in which propylene polymers and a propylene-ethylene copolymer are subjected to multi-step polymerization.

Preferably, in the first and second steps of the multi-step polymerization, propylene polymers are formed by use of a stereospecific catalyst such that each propylene polymer possesses physical properties that differ from those possessed by the other propylene polymer, and in the third step a propylene-ethylene copolymer is formed.

Examples of the stereospecific catalyst which is used in the above multi-step polymerization include a catalyst comprising a transition metal halide, an organic aluminum compound, and optional lactones.

Examples of preferable transition metal halides include titanium halides, and titanium trichloride is particularly preferred. Examples of the variation of titanium trichloride include reductants of titanium tetrachloride obtained through any of a variety of methods; activated species of the reductants obtained through further ball-mill treatment and/or washing with a solvent such as an inert solvent or an inert solvent containing a polar compound; amine-, ether-, ester-, sulfur- or halogen-derivatives of titanium trichloride or eutectic crystals of titanium trichloride such as TiCl$_3$.⅓AlCl$_3$; and titanium trichloride which is co-crushed with an organic or inorganic nitrogen or phosphorus compound. A titanium halide-on-magnesium carrier may also be used.

Examples of the organic aluminum compound include compounds represented by formula (I):

$$AlR_nX_{3-n} \qquad (I)$$

wherein R represents a C1–C10 alkyl group; X represents a halogen atom; and n represents a number of 0<n≦3.

Examples of the aluminum compounds include dimethylaluminum chloride, diethylaluminum chloride, ethylaluminum sesquichloride, ethylaluminum dichloride, and triethylaluminum. These aluminum compounds may be used singly or in combination of two or more species, and are typically used in an amount of 1–100 mol based on one mol of the above-described transition metal halides.

Examples of the optionally used lactones include species represented by formula (II):

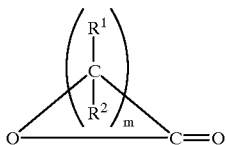

wherein each of $R^1$ and $R^2$, which may be identical to or different from each other, represents a hydrogen atom or a hydrocarbon group having 20 or less carbon atoms such as saturated aliphatic, unsaturated aliphatic, alicyclic, or aromatic groups; and m represents an integer between 2 and 8 inclusive.

Examples of the lactones include γ-lactones such as γ-butyrolactone, γ-valerolactone, γ-caprolactone, γ-caprylolactone, γ-laurolactone, γ-palmitolactone, or γ-stearolactone; δ-lactones such as δ-valerolactone or δ-caprolactone; ε-lactones such as ε-caprolactone; and β-lactones such as β-propiolactone or dimethylpropiolactone. Of these, γ-lactones and ε-lactones are preferred, with γ-butyrolactone, γ-caprolactone, and ε-caprolactone being particularly preferred. These lactones may be used singly or in combination of two or more species, and are typically used in an amount of 0.01–10 mol based on one mol of the above-described transition metal halides.

During the above-described multi-step polymerization, in the first step, polymerization of propylene is preferably performed at 50–70° C. so as to form a propylene polymer in an amount corresponding to the polymerization ratio of 60–80 wt. % based on the total polymerization amount. When the polymerization ratio is less than 60 wt. %, the obtained propylene has poor rigidity, whereas when it is in excess of 80 wt. %, the impact strength thereof decreases.

Subsequently, in the second step, polymerization of propylene is preferably performed at 50–70° C. so as to form a propylene polymer in an amount corresponding to the polymerization ratio of 10–20 wt. % based on the total polymerization amount. When the polymerization ratio is less than 10 wt. %, the obtained propylene has poor rigidity, whereas when it is in excess of 20 wt. %, the impact strength thereof decreases.

Finally, in the third step, copolymerization of propylene and ethylene is preferably performed at 45–65° C. so as to form a propylene-ethylene copolymer having an ethylene unit content of 40–75 wt. % in an amount corresponding to the polymerization ratio of 8–15 wt. % based on the total polymerization amount. Upon completion of the steps, the propylene resin of the present invention contains ethylene in an amount of about 3 to about 12 wt. %. When the formation amount of the propylene-ethylene copolymer is less than 8 wt. %, the obtained propylene resin has low impact strength, whereas when it is in excess of 15 wt. %, the rigidity thereof decreases. Furthermore, when the propylene-ethylene copolymer contains ethylene units in an amount of less than 40 wt. %, the obtained propylene resin has low impact strength, whereas when it is in excess of 60 wt. %, the rigidity thereof decreases. The ethylene unit content is obtained by measuring the infrared absorption spectrum thereof.

For each reaction step the pressure of the polymerization reactions is typically selected within a range from normal pressure to 30 kg/cm$^2$G, preferably 1–15 kg/cm$^2$G.

Examples of the method of polymerization include a continuous method making use of three or more polymerization tanks; a batch method making use of one or more polymerization tanks; and a combination thereof. No particular limitation is imposed on the polymerization method, and there may be employed any method, such as suspension polymerization, liquid polymerization, or gas-phase polymerization.

When a solvent is used, examples of the solvent include aliphatic hydrocarbons such as heptane or hexane; alicyclic hydrocarbons such as cyclohexane; and aromatic hydrocarbons such as benzene or toluene. These solvents may be used singly or in combination of two or more species.

The antioxidant of the present invention will next be described.

With regard to the antioxidant of the present invention, a phenolic antioxidant and a phosphorus-containing antioxidant are used in combination. When no antioxidant is used or either of a phenolic antioxidant or a phosphorus-containing antioxidant is used, the change of MI after 100%-recycle-test is large, and ΔMI might be insufficiently decreased.

With regard to the phenolic antioxidant or the phosphorus-containing antioxidant which is used in the present invention, there may be used any of a variety of antioxidants, including commercially available antioxidants.

With regard to the phenolic antioxidant and the phosphorus-containing antioxidant which are used in the present invention, a variety of compounds including commercially available ones may be used.

Conventionally known phenolic antioxidants may be used without particular limitation. Examples include 2,6-di-t-butyl-4-methylphenol, 2,6-di-t-butyl-4-ethylphenol, 2,6-dicyclohexyl-4-methylphenol, 2,6-diisopropyl-4-ethylphenol, 2,6-di-t-amyl-4-methylphenol, 2,6-di-t-octyl-4-n-propylphenol, 2,6-dicyclohexyl-4-n-octylphenol, 2-isopropyl-4-methyl-6-t-butylphenol, 2-t-butyl-2-ethyl-6-t-octylphenol, 2-isobutyl-4-ethyl-6-t-hexylphenol, 2-cyclohexyl-4-n-butyl-6-isopropylphenol, dl-α-tocopherol, t-butylhydroquinone, 2,2'-methylenebis(4-methyl-6-t-butylphenol), 4,4'-butylidenebis(3-methyl-6-t-butylphenol), 4,4'-thiobis(3-methyl-6-t-butylphenol), 2,2'-thiobis(4-methyl-6-t-butylphenol), 4,4'-methylenebis(2,6-di-t-butylphenol), 2,2'-methylenebis[6-(1-methylcyclohexyl)-p-cresol], 2,2'-ethylidenebis(2,4-di-t-butylphenol), 2,2'-butylidenebis(2-t-butyl-4-methylphenol), 1,1,3-tris(2-methyl-4-hydroxy-5-t-butylphenyl)butane, triethylene glycolbis[(3-t-butyl-5-methyl-4-hydroxyphenyl)propionate], 1,6-hexanediol-bis[3-(3,5-di-t-butyl-4-hydroxyphenyl)propionate], 2,2-thiodiethylenebis[3-(3,5-di-t-butyl-4-hydroxyphenyl)propionate], N,N'-hexamethylenebis(3,5-di-t-butyl-4-hydroxy-hydrocinnamide), diethyl 3,5-di-t-butyl-4-hydroxybenzylphosphonate, 1,3,5-tris(2,6-dimethyl-3-hydroxy-4-t-butylbenzyl) isocyanurate, 1,3,5-tris[(3,5-dibutyl-4-hydroxyphenyl)propionyloxyethyl] isocyanurate, tris(4-t-butyl-2,6-dimethyl-3-hydroxybenzyl isocyanurate, 2,4-bis(n-octylthio)-6-(4-hydroxy-3,5-di-t-butylanilino)-1,3,5-triazine, tetrakis[methylene-3,5-di-t-butyl-4-hydroxyphenyl)propionate]methane, bis(ethyl 3,5-di-t-butyl-4-hydroxybenzylphosphonate)calcium, bis(ethyl 3,5-di-t-butyl-4-hydroxybenzylphosphonate)nickel, a bis[3,3-bis(3-t-4-hydroxyphenyl)butylic acid] glycol ester, N,N'-bis[(3,5-di-t-butyl-4-hydroxyphenyl)propionyl]hydrazine, 2,2'- oxamidobis[ethyl-3-(3,5-di-t-butyl-4-hydroxyphenyl) propionate], 2,2'-methylenebis(4-methyl-6-t-butylphenol) terephthalate, 1,3,5-trimethyl-2,4,6-tris(3,5-di-t-butyl-4-hydroxybenzyl)benzene, 3,9-bis[1,1-dimethyl-2-{(3-t-butyl-4-hydroxy-5-methylphenyl)propionyloxy}ethyl]-2,4, 8,10-tetraoxaspiro[5.5]undecane, 2,2-bis[4-(2-(3,5-di-t-butyl-4-hydroxyhydrocinnamoyloxy))ethoxyphenyl] propane, alkyl β-(3,5-di-t-butyl-4-hydroxyphenyl) propionate, n-octadecyl β-(4'-hydroxy-3',5'-di-t-butylphenyl)propionate, and butylated hydroxytoluene.

Of these, examples of the compounds which are preferably used include 2,6-di-t-butyl-4-methylphenol, 2,6-di-t-butyl-4-ethylphenol, triethylene glycol-bis[3-(3-t-butyl-5-methyl-4-hydroxyphenyl)propionate], 1,6-hexanediolbis[3-[3,5-di-t-butyl-4-hydroxyphenyl)propionate], 2,2-thiodiethylenebis[3-(3,5-di-t-butyl-4-hydroxyphenyl) propionate], N,N'-hexamethylenebis(3,5-di-t-butyl-4-hydroxy-hydrocinnamide), diethyl 3,5-di-t-butyl-4-hydroxybenzylphosphonate, 1,3,5-tris(2,6-dimethyl-3-hydroxy-4-t-butylbenzyl) isocyanurate, 1,3,5-tris[(3,5-di-t-butyl-4-hydroxyphenyl)propionyloxyethyl] isocyanurate, tris(4-t-butyl-2,6-dimethyl-3-hydroxybenzyl) isocyanurate, 2,4-bis(n-octylthio)-6-(4-hydroxy-3,5-di-t-butylanilino)-1, 3,5-triazine, tetrakis[methylene-3-(3,5-di-t-butyl-4-hydroxyphenyl)propionate]methane, bis(ethyl 3,5-di-t-butyl-4-hydroxybenzylphosphonate)calcium, bis(ethyl 3,5-di-t-butyl-4-hydroxybenzylphosphonate)nickel, a bis[3,3-bis(3-t-4-hydroxyphenyl)butylic acid] glycol ester, N,N'-bis [(3,5-di-t-butyl-4-hydroxyphenyl)propionyl]hydrazine, 2,2'-oxamidobis[ethyl-3-(3,5-di-t-butyl-4-hydroxyphenyl) propionate], 2,2'-methylenebis(4-methyl-6-t-butylphenol) terephthalate, 1,3,5-trimethyl-2,4,6-tris(3,5-di-t-butyl-4-hydroxybenzyl)benzene, 3,9-bis[1,1-dimethyl-2-{β-(3-t-butyl-4-hydroxy-5-methylphenyl)propionyloxy}ethyl]-2,4, 8,10-tetraoxaspiro[5.5]undecane, 2,2-bis[4-(2-(3,5-di-t-butyl-4-hydroxyhydrocinnamoyloxy))ethoxyphenyl] propane, alkyl β-(3,5-di-t-butyl-4-hydroxyphenyl) propionate, n-octadecyl β-(41-hydroxy-3',5'-di-t-butylphenyl)propionate, and butylated hydroxytoluene.

Particularly preferable examples among the above alkyl ester of β-(3,5-di-t-butyl-4-hydroxyphenyl)propionic acid are alkyl esters thereof having 18 or less carbon atoms.

Furthermore, examples of the compounds which are particularly preferably used include 2,6-di-t-butyl-4-methylphenol, tetrakis[methylene-3-(3,5-di-t-butyl-4-hydroxyphenyl)propionate]methane, bis(ethyl 3,5-di-t-butyl-4-hydroxybenzylphosphonate)calcium, bis(ethyl 3,5-di-t-butyl-4-hydroxybenzylphosphonate)nickel, a bis[3,5-bis(4-hydroxy-3-t-butylphenyl)butylic acid] glycol ester, N,N'-bis[(3,5-di-t-butyl-4-hydroxyphenyl)propionyl] hydrazine, 2,2'-oxamidobis[ethyl-3-(3,5-di-t-butyl-4-hydroxyphenyl)propionate], 2,2'-methylenebis(4-methyl-6-t-butylphenol) terephthalate, 1,3,5-trimethyl-2,4,6-tris(3,5-di-t-butyl-4-hydroxybenzyl)benzene, 3,9-bis[1,1-dimethyl-2-{β-(3-t-butyl-4-hydroxy-5-methylphenyl) propionyloxy}ethyl]-2,4,8,10-tetraoxaspiro[5.5]undecane, 1,3,5-tris[(3,5-di-t-butyl-4-hydroxyphenylpropionyloxyethyl] isocyanurate, 2,2-[4-(2-(3,5-di-t-butyl-4-hydroxyhydrocinnamoyloxy)) ethoxyphenyl]propane, n-octadecyl β-(4'-hydroxy-3',5'-di-t-butylphenyl)propionate, and butylated hydroxytoluene.

These phenolic antioxidants may be used singly or in combination of two or more species.

Conventionally known phosphorus-containing antioxidants may be used without particular limitation. Examples include trioctyl phosphite, trilauryl phosphite, tridecyl phosphite, octyl-diphenyl phosphite, tris(2,4-di-t-butylphenyl) phosphite, triphenyl phosphite, tris (butoxyethyl) phosphite, tris(nonylphenyl) phosphite, distearylpentaerythritol diphosphite, tetra(tridecyl)-1,1,3-tris (2-methyl-5-t-butyl-4-hydroxyphenyl)butane diphosphite, tetra(C12–C15 alkyl mixture)-4,4'-isopropylidene diphenyl phosphite, tetra(tridecyl)-4,4'-butylidenebis(3-methyl-6-t-butylphenol) diphosphite, tris(3,5-di-t-butyl-4-hydroxyphenyl)phosphite, tris(mono-di mixture of nonylphenyl) phosphite, hydrogenated-4,4'-isopropylidenediphenol polyphosphite, bis(octylphenyl).bis [4,4'-butylidenebis(3-methyl-6-t-butylphenol)].1,6-hexanediol diphosphite, phenyl.4,4'-isopropylidenediphenol.pentaerythritol diphosphite, tris[4, 4'-isopropylidene-bis(2-t-butylphenol)] phosphite, phenyl.diisodecyl phosphite, di(nonylphenyl)pentaerythritol diphosphite, tris(1,3-di-stearoyloxyisopropyl) phosphite, 4,4'-isopropylidenebis(2-t-butylphenol) di(nonylphenyl) phosphite, 9,10-di-hydro-9-oxa-9-oxa-10-phosphaphenanthrene-10-oxide, and 4,4'-butylidene-bis(3-methyl-6-t-butylphenyl-di-tridecyl phosphite).

There may also be used bis(dialkylphenyl)-pentaerythritol diphosphite esters represented by the below-described formula (III), spiro-type, and (IV), cage-type:

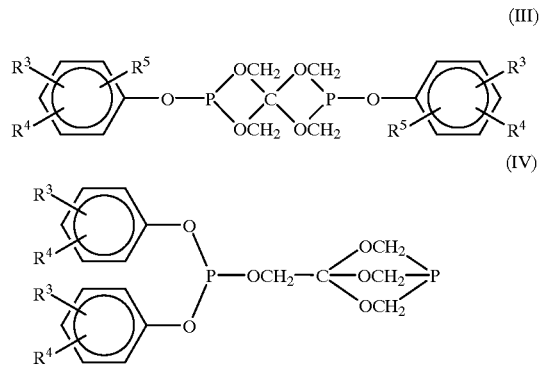

wherein each of $R^3$, $R^4$, and $R^5$ represents hydrogen or a C1–C9 alkyl group, with a tertiary butyl group being particularly preferred among branched alkyl groups and 2-, 4-, and 6-positions of a phenyl group being most preferable as substitution sites thereof. Examples of the preferable phosphite esters include bis(2,4-di-tert-butylphenyl) pentaerythritol diphosphite, bis(2,6-di-tert-butyl-4-methylphenyl)pentaerythritol diphosphite, and tetrakis(2,4-di-tert-butylphenyl)-4,4'-biphenylene as a phosphite in which carbon and phosphorus are directly linked. These phosphorus-containing antioxidants may be used singly or in combination of two or more species.

The amount of the antioxidant which is added is not unconditionally determined, since the preferable range of the amount varies in accordance with species and combination of a propylene resin and the antioxidant. However, in typical cases, the antioxidant is added in an amount of 1,500 ppm or more, in terms of a total amount of a phenolic antioxidant and a phosphorus-containing antioxidant, based on the amount of the propylene resin, preferably 2,000–6, 000 ppm, more preferably 2,500–4,500 ppm. When the amount is less than 1,500 ppm, the recyclability of a propylene resin composition when blow-molded might decrease to thereby cause poor productivity, whereas when it is 6,000 ppm or more, coloring and bleeding might be generated on obtained moldings. Generally, the phenolic antioxidant is added in an amount of 500 ppm or more based on the amount of the propylene resin, preferably 1,000–5, 000 ppm, more preferably 1,500–3,000 ppm, and the phosphorus-containing antioxidant is added in an amount of typically 500 ppm or more, preferably 1,000–5,000 ppm, more preferably 1,500–3,000 ppm.

The mixing ratio of the phenolic antioxidant and the phosphorus-containing antioxidant is preferably about 1/5–5/1 in terms of the ratio of phenolic antioxidant/ phosphorus-containing antioxidant, more preferably about 1/3–3/1, further more preferably about 1/2–2/1. When the mixing ratio of the phenolic antioxidant and the phosphorus-containing antioxidant falls outside the above range, the recyclability of a propylene resin composition during blow-molding might decrease.

In the present invention, in addition to the phenolic antioxidant and the phosphorus-containing antioxidant, there may be used another antioxidant. In this case, the total amount of the phenolic antioxidant, the phosphorus-containing antioxidant, and another antioxidant which are added, based on the propylene resin is 1,600 ppm or more, preferably 2,100–10,000 ppm, more preferably 2,600–4,500 ppm. The mixing ratio of a phenolic antioxidant and a phosphorus-containing antioxidant is more preferably regulated to fall within the above-described range.

In the present invention, there may be used a variety of known other antioxidants in combination in addition to the phenolic antioxidant and the phosphorus-containing antioxidant. Among such other antioxidants, a thioether antioxidant is preferred.

No particular limitation is imposed on the thioether antioxidant, and conventionally known thioether antioxidants may be used. Examples thereof include dialkyl dithiopropionates such as dilauryl, dimyristyl, or distearyl dithiopropionate; and esters (such as pentaerythritol tetralaurylthiopropionate) of a polyhydric alcohol such as glycerin, trimethylolethane, trimethylolpropane, pentaerythritol, or trishydroxyethyl isocyanurate and an alkyl thiopropionate such as butyl, octyl, lauryl, or stearyl thiopropionate. More specific examples includes dilauryl thiodipropionate, dimyristyl thiodipropionate, distearyl thiodipropionate, lauryl stearyl thiodipropionate, and distearyl thiodibutyrate.

These thioether antioxidants may be used singly or in combination two or more species.

In the present invention, a nucleating agent, or a substance having a nucleating effect, is preferably added to the propylene resin. Any nucleating agent is acceptable so long as it promptly induces a crystalline nucleus without impairing physical properties of the propylene resin and decreases a degree of supercooling required for initiation of crystallization. Examples of such a nucleating agent include high-melting-point polymers; organic carboxylic acid or its metal salts; aromatic sulfonate or its metal salts; organic phosphate compounds or their metal salts; dibenzylidenesorbitol or its derivatives; partial metal salts of rhodinic acid; inorganic particles; imides; amides; quinacridones; quinones; and mixtures thereof.

In the present invention, so long as the object of the invention is not impaired, a filler may be added to a propylene polymer composition. Examples of such a filler include silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fiber, glass flakes, glass beads, potassium silicate, montmorillonite, bentonite, graphite, aluminum powder, molybdenum sulfide, boron fiber, silicon carbide fiber, polyethylene fiber, polypropylene fiber, polyester fiber, and polyamide fiber.

The thus-obtained propylene resin, when used in blow molding, shows excellent recycling performance, and, when used in blow molding a large-sized article, improves productivity.

A blow-molded article of the present invention is made from the above-mentioned propylene resin, to which various additives are added as needed. Examples of such additives include soft elastomer, modified polyolefin, antioxidants, heat resistance stabilizers, weatherproof stabilizers, inorganic or organic fillers, antistatic agents, chlorine-uptaking agents, slip agents, flame retardants, and coloring agents.

A blow molding method of the present invention is not particularly limited, but a conventional blow molding method for a propylene resin may be used.

A blow-molded article of the present invention made from a propylene polymer composition may be manufactured through use of a conventional blow molding machine. Conventional blow molding conditions may also be employed. For example, resin temperature is not lower than 180° C., preferably 200° C. to 230° C., more preferably 205° C. to 225° C. The above-mentioned propylene polymer composition having a proper temperature is extruded in the form of a molten tube-shaped parison. Next, the parison is held within a shaping mold. Subsequently, air is blown into the mold so as to shape the parison according to the profile of the mold, yielding a hollow molded article. The draw ratio in a lateral direction is preferably 1.0 to 5.

The thus-obtained blow-molded article of the present invention features light weight and excellent rigidity, dimensional stability, and heat resistance, and is favorably usable as, particularly, an automobile part, such as a bumper, bumper beam, trunk board, seat back, instrument panel, or spoiler.

EXAMPLES

The present invention will next be described by way of example, which should not be construed as limiting the invention.

The melt index (MI) and the elongational viscosity (Y) of a propylene resin were obtained according to the methods described herein. The ethylene unit content was obtained through measurement of infrared absorption spectrum. The elastic modulus in tension was obtained according to JIS K7113. The Izod impact value (at −20° C.) was obtained according to JIS K7110. The melt tension (MT) was measured through use of CAPIROGRAPH manufactured by Toyo Seiki Co., Ltd., at a temperature of 230° C., an orifice length of 8 mm, an orifice diameter of 2.1 mm, a take-up rate of 3.1 m/min, and an extrusion rate of 10 mm/min.

Example 1

(1) Manufacture of propylene resin composition

N-heptane (4 liters), diethylaluminum chloride (5.7 millimols), and titanium trichloride (0.7 g) were placed in an autoclave equipped with a stirrer and having a capacity of 10 liters.

Next, while the liquid phase temperature was maintained at 60° C., hydrogen was added into the autoclave in an amount such that the generating propylene polymer had predetermined physical properties, and propylene was continuously fed into the autoclave so as to establish a reaction pressure of 9 kg/cm$^2$G. The resultant mixture was stirred for 90 minutes to thereby perform first-step polymerization. Subsequently, unreacted propylene was removed, hydrogen was fed into the autoclave in a predetermined amount and at a temperature of 60° C., and propylene was continuously fed into the autoclave in such a manner as to establish a reaction pressure of 7 kg/cm$^2$G, thereby performing second-step polymerization for 40 minutes.

To the resultant polymerized product was added n-butanol. The resultant mixture was stirred for 1 hour at a temperature of 65° C. so as to decompose catalyst, followed by separation, washing, and drying, thereby yielding a propylene resin in the form of white powder. The obtained propylene resin showed a melt index (MI) of 0.54 g/10 min and a melt tension (MT) of 4.1.

Additives listed below were added to the obtained propylene resin. The resultant mixture was kneaded through use of a bidirectional twin-screw kneader (model 2FCM manufactured by Kobe Steel, Ltd.), at a set temperature of 200° C. and a rotational screw speed of 800 rpm. At this time, the temperature of the molten substance was 250° C. The molten substance was extruded into strands through use of an extruder. The strands were pelletized through use of a pelletizer, thereby yielding a propylene resin composition in pellet form.

Additives:
(I) Phenolic antioxidant
  IRGANOX 1010 manufactured by Ciba Specialty Chemicals Corp.: 2,000 ppm
(II) Phosphorus-containing antioxidants
  IRGAPHOS 168 manufactured by Ciba Specialty Chemicals Corp.: 1,000 ppm
  SANDOSTOB P-EPQ manufactured by Clariant Japan Corp.: 1,000 ppm
(III) Other additive
  Neutralizer . . . calcium stearate: 500 ppm (2) Recycle test Through use of the ventless uniaxial extruder VS40-28, manufactured by Tanabe Plastic Machinery Co., Ltd., a propylene resin composition was extruded and pelletized under the following extruding conditions, thereby yielding single-extrusion pellets.

Extruding conditions:
  Extruder: VS40-28 manufactured by Tanabe Plastic Machinery Co., Ltd.
  Screw: 40 mm diameter
  Preset temperatures of extruder:
    Cylinder No. 1 . . . 240° C.
    Cylinder No. 2 . . . 260° C.
    Cylinder No. 3 . . . 280° C.
    Cylinder No. 4 . . . 260° C.
    Cylinder No. 5 . . . 280° C.
    Dies . . . 280° C.
  Resin temperature: 270° C.
  Rotational screw speed: 75 rpm
  Screen mesh: 40/80
  Vent: None
  L/D of screw: 26
  Discharge rate: 15 kg/hour The above single-extrusion pellets were again subjected to extrusion and pelletization under the above conditions except that the temperature settings of the extruder were adjusted so as to obtain a resin temperature of 270° C., thereby yielding duple-extrusion pellets. Further, the extrusion-and-pelletization cycle was repeated under the above conditions except that the temperature settings of the extruder were adjusted so as to obtain a resin temperature of 270° C. at each cycle, until quintuple-extrusion pellets were obtain. The propylene resin composition before the recycle test and the quintuple-extrusion pellets were measured for melt index. The results are shown in Table 1.

(3) Evaluation of drawdown characteristic on actual molding machine

A propylene resin composition was manufactured according to the above-mentioned conditions for manufacturing a propylene resin composition which were scaled up accordingly. Through use of the thus-manufactured propylene resin, automobile bumper beams, each having dimensions of 1,400×100×100 mm and a weight of 5 kg, were continuously molded. Flash were pulverized and fed into a hopper in an amount similar to the charge of the propylene resin composition (about 5 kg for each molding).

At the time of starting the continuous production of automobile bumper beams and 3 hours after start of the continuous production, a parison having a predetermined length and weight (for manufacture of a bumper beam having a length of 1,900 mm and a weight of 10 kg) was injected into a mold from an accumulator. A variation in parison length over 5 seconds required for closing the mold was measured. The drawdown characteristic was evaluated under the following criteria. The results are shown in Table 1.

| | |
|---|---|
| $L/L_0 < 1.10$ | A: Very good |
| $1.10 \leq L/L_0 \leq 1.15$ | B: Good |
| $1.15 < L/L_0$ | F: Failure |

$L_0$: Parison length as measured at completion of injection
L: Parison length as measured 5 seconds after end completion of injection Molding conditions
  Molding machine: 90 mmφ
  Screw: 90 mmφ
  Die: 100 mmφ
  Accumulator: 15 liters
  Mold clamping force: 60 tons
  Rotational screw speed: 40 rpm
  Motor load: 115 A
  Temperature conditions
  Cylinders No. 1: 230° C.
    No. 2: 210° C.
    No. 3: 190° C.
    No. 4: 190° C.
  Crossheads No. 1: 190° C.
    No. 2: 190° C.
    No. 3: 190° C.
  Dies No. 1: 190° C.
    No. 2: 190° C.
  Molding cycle: 180 sec Die temperature: 28° C.
Resin temperature: 220° C.
Parison weight: approx. 10 kg

Example 2

Additives listed below were added to the propylene resin composition manufactured in Example 1, yielding a propylene resin composition of Example 2. In a manner similar to that of Example 1, the propylene resin composition of Example 2 was subjected to the 100% recycle test and was evaluated for drawdown characteristic on the actual molding machine. The results are shown in Table 1.

Additives:
(1) Phenolic antioxidants
   SUMILIZER BHT manufactured by Sumitomo Chemical Co., Ltd.: 1,500 ppm
   IRGANOX 1010 manufactured by Ciba Specialty Chemicals Corp.: 1,500 ppm
(2) Phosphorus-containing antioxidants
   ADEKASTAB P manufactured by Asahi Denka Kogyo K.K.: 500 ppm
   MARK PEP-36 manufactured by Asahi Denka Kogyo K.K.: 500 ppm
(3) Other additive
   Neutralizer . . . calcium stearate: 500 ppm

Example 3

Additives listed below were added to the propylene resin composition manufactured in Example 1, yielding a propylene resin composition of Example 3. In a manner similar to that of Example 1, the propylene resin composition of Example 3 was subjected to the 100% recycle test and was evaluated for drawdown characteristic on the actual molding machine. The results are shown in Table 1.

Additives:
(1) Phenolic antioxidant
   IRGANOX 1010 manufactured by Ciba Specialty Chemicals Corp.: 2,000 ppm
(2) Phosphorus-containing antioxidants
   IRGAPHOS 168 manufactured by Ciba Specialty Chemicals Corp.: 1,000 ppm
   SANDOSTOB P-EPQ manufactured by Clariant Japan Corp.: 1,300 ppm
(3) Other additive
   Neutralizer . . . calcium stearate: 500 ppm

Example 4

(1) Manufacture of propylene resin composition

N-heptane (4 liters), diethylaluminum chloride (5.7 millimols), and titanium trichloride (0.7 g) were placed in an autoclave (capacity: 10 liters) equipped with a stirrer.

Next, while the liquid phase temperature was maintained at 60° C., hydrogen was introduced into the autoclave in such an amount as to impart predetermined physical properties to a propylene polymer to be generated, and propylene was continuously fed into the autoclave in such a manner as to establish a reaction pressure of 9 kg/cm$^2$G. The resultant mixture was stirred for 90 minutes to thereby perform first-step polymerization. Subsequently, unreacted propylene was removed, hydrogen was fed into the autoclave in a predetermined amount and at a temperature of 60° C., and propylene was continuously fed into the autoclave in such a manner as to establish a reaction pressure of 7 kg/cm$^2$G, thereby performing second-step polymerization for 40 minutes.

Further, hydrogen was fed into the autoclave in a predetermined amount and at a temperature of 57° C., and a mixture of propylene and ethylene was continuously fed into the autoclave in such a manner as to establish a reaction pressure of 5 kg/cm$^2$G, thereby performing third-step polymerization for 30 minutes.

To the resultant polymerized product was added n-butanol. The resultant mixture was stirred for 1 hour at a temperature of 65° C. so as to decompose catalyst, followed by separation, washing, and drying, thereby yielding a propylene resin in the form of white powder. The obtained propylene resin showed a melt index (MI) of 0.60 g/10 min and a melt tension (MT) of 3.9, and an ethylene content of 6.0% by weight.

Additives listed below were added to the obtained propylene resin in a manner similar to that of Example 1, thereby yielding a propylene resin composition of Example 4. In a manner similar to that of Example 1, the propylene resin composition of Example 4 was subjected to the 100% recycle test and was evaluated for moldability. The results are shown in Table 1.

Additives:
(1) Phenolic antioxidant
   IRGANOX 1010 manufactured by Ciba Specialty Chemicals Corp.: 500 ppm
(2) Phosphorus-containing antioxidants
   IRGAPHOS 168 manufactured by Ciba Specialty Chemicals Corp.: 400 ppm
   SANDOSTOB P-EPQ manufactured by Clariant Japan Corp.: 200 ppm
(3) Other antioxidant
   DMTP (trade name: YOSHITOMI) manufactured by Yoshitomi Fine Chemical Ltd.: 1,000 ppm
(4) Other additive
   Neutralizer . . . calcium stearate: 1,000 ppm

Example 5

A propylene resin was obtained in a manner similar to that of Example 4 except that the amounts of hydrogen, propylene, and ethylene added for polymerization were chnaged. The obtained propylene resin showed a melt index (MI) of 0.40 g/10 min and a melt tension (MT) of 5.4, and an ethylene content of 6.2% by weight.

Additives listed below were added to the obtained propylene resin in a manner similar to that of Example 1, thereby yielding a propylene resin composition of Example 5. In a manner similar to that of Example 1, the propylene resin composition of Example 5 was subjected to the 100% recycle test and was evaluated for moldability. The results are shown in Table 1.

Additives:
(1) Phenolic antioxidant
   IRGANOX 1010 manufactured by Ciba Specialty Chemicals Corp.: 2,000 ppm
(2) Phosphorus-containing antioxidants
   IRGAPHOS 168 manufactured by Ciba Specialty Chemicals Corp.: 1,000 ppm
   SANDOSTOB P-EPQ manufactured by Clriant Japan Corp.: 1,000 ppm
(3) Other additive
   Neutralizer . . . calcium stearate: 500 ppm

Comparative Example 1

70% by weight of polypropylene (ethylene content: 5% by weight; MI: 0.9 g/10 min), 20% by weight of high-density polyethylene (MI (HLMI): 3.8 g/10 min as measured at a load of 21.6 kg and a temperature of 230° C.), and 10% by weight ot talc were mixed to obtain a propylene resin composition.

Additives listed below were added to the obtained propylene resin composition in a manner similar to that of Example 1, yielding a propylene resin composition of Comparative Example 1. In a manner similar to that of Example 1, the propylene resin composition of Comparative Example 1 was subjected to the 100% recycle test and was evaluated for moldability on the actual molding machine. The results are shown in Table 1.

Additives:

(1) Phenolic antioxidant

IRGANOX 1010 manufactured by Ciba Specialty Chemicals Corp.: 1,500 ppm (2) Phosphorus-containing antioxidants SANDOSTOB P-EPQ manufactured by Clariant Japan Corp.: 500 ppm (3) Other additive Neutralizer . . . calcium stearate: 500 ppm

TABLE 1

| | Recycle test results | | | Evaluation of drawdown characteristic (L/L$_0$) on actual molding machine | | | |
|---|---|---|---|---|---|---|---|
| | MIi | MIe | ΔMI | Start of production | Three hours after start of production | Variation in drawdown | Overall evaluation |
| Example 1 | 0.51 | 0.90 | 0.39 | 1.07 A | 1.09 A | 0.02 | A |
| Example 2 | 0.57 | 1.06 | 0.49 | 1.10 B | 1.14 B | 0.04 | A |
| Example 3 | 0.51 | 0.88 | 0.39 | 1.08 A | 1.10 B | 0.02 | A |
| Example 4 | 0.57 | 1.06 | 0.49 | 1.11 B | 1.15 B | 0.05 | B |
| Example 5 | 0.44 | 0.86 | 0.42 | 1.05 A | 1.08 A | 0.03 | A |
| Comparative Example 1 | 0.54 | 1.31 | 0.76 | 1.09 A | 1.19 F | 0.10 | F: Uncontrollable due to violent variation |
| Comparative Example 2 | 0.40 | 1.02 | 0.62 | 1.05 A | 1.12 B | 0.07 | C: Frequent control due to great variation |

Additives:

(1) Phenolic antioxidants

SUMILIZER BHT manufactured by Sumitomo Chemical Co., Ltd.: 1,500 ppm

IRGANOX 1010 manufactured by Ciba Specialty Chemicals Corp.: 1,500 ppm (2) Phosphorus-containing antioxidants ADEKASTAB P manufactured by Asahi Denka Kogyo K.K.: 500 ppm MARK PEP-36 manufactured by Asahi Denka Kogyo K.K.: 500 ppm (3) Other additive Neutralizer . . . calcium stearate: 500 ppm Comparative Example 2

A propylene resin was obtained in a manner similar to that of Example 4 except that the amounts of hydrogen, propylene, and ethylene added for polymerization were changed. The obtained propylene resin showed a melt index (MI) of 0.55 g/10 min and a melt tension (MT) of 3.5, and an ethylene content of 6.0% by weight.

Additives listed below were added to the obtained propylene resin in a manner similar to that of Example 1, thereby yielding a propylene resin composition of Comparative Example 2. In a manner similar to that of Example 1, the propylene resin composition of Comparative Example 2 was subjected to the 100% recycle test and was evaluated for moldability. The results are shown in Table 1.

What is claimed is:

1. A propylene resin composition suitable for the preparation of blow-molded articles comprising a propylene resin, a phenolic antioxidant, and a phosphorus-containing antioxidant, wherein a differential melt index (ΔMI) calculated from a melt index (MIi) as measured at a propylene resin composition temperature of 230° C. and under a load of 2,169 g and a melt index (MIe) as measured at a propylene resin composition temperature of 230° C. and under a load of 2,160 g after five repetitions of a 100% recycle test is not greater than 0.5 g/10 min, and an MIe is not greater than 1.2 g/10 min, wherein the propylene resin composition satisfies the following relationship between elongational viscosity ($\eta_E$) and melt index (MIi) as measured at a temperature of 230° C. and under a load of 2,160 g:

$$2.0 \times 10^5 \times MIi^{-0.68} \geq \eta_E \geq 1.5 \times 10^5 \times MIi^{-0.68}.$$

2. A propylene resin composition according to claim 1, wherein the propylene resin is obtained through multi-step polymerization of a propylene polymer and a propylene-ethylene copolymer.

3. A propylene resin composition according to claim 1, wherein the phenolic antioxidant and the phosphorus-containing antioxidant are added in a total amount of not less than 2,000 ppm with respect to the propylene resin.

4. A blow-molded article obtained through blow molding of a propylene resin composition as described in claim 1.

5. An automobile bumper obtained through blow molding of a propylene resin composition as described in claim 1.

6. A propylene resin composition according to claim 3, wherein the phenolic antioxidant is added in an amount of 500 ppm or more and the phosphorus-containing antioxidant is added in an amount of 500 ppm or more based on the amount of the propylene resin and the mixing ratio of the phenolic antioxidant to the phosphorus-containing antioxidant is about 1:2 to 2:1.

* * * * *